Patented July 10, 1951

2,560,188

UNITED STATES PATENT OFFICE 2,560,188

CERAMIC COMPOSITIONS

Daniel Rosenthal, Brooklyn, N. Y.

No Drawing. Application August 18, 1947,
Serial No. 769,317

5 Claims. (Cl. 106—42)

This invention relates to improvements in ceramic compositions, more particularly it relates to such compositions which are formed by the combining of several metallic oxides, and whose resultant characteristics are determined by the proportion of titanium oxide employed.

In my co-pending application, Serial No. 594,796, now Patent No. 2,425,954 granted August 18, 1947, entitled Synthetic Gem Composition and Method, I have disclosed my invention in a material made up of metallic oxides in which material copper oxide and titanium oxide form the minor portion, while the major portion is made up of at least two of the oxides from the group; iron oxide, cobalt oxide, nickel oxide and chromium oxide. I also disclosed the method for the compounding and finishing of such a material. That material is highly effective for the uses specified in said application, but I have now discovered improvements upon the material which not only enhance the value of the material for the uses set forth in said application, but also render it susceptible to a variety of other uses.

In accordance with the discovery and invention forming the subject matter of the instant application, I have found that a ceramic composition of metallic oxides, which consists of copper oxide, titanium oxide and two or more of the oxides taken from the group; iron oxide, cobalt oxide, nickel oxide and chromium oxide, has generally improved characteristics when the amount of titanium oxide is increased in relation to the copper oxide, and further improved results when that increase brings the amount of titanium oxide present in greater amount than the sum of the copper oxide and the two or more other oxides taken together. The characteristics of the composition are dependent upon the quantity of titanium oxide which, as just indicated, may be merely increased in quantity over the copper oxide or may run up to a proportion which exceeds the sum of all the other oxides.

When maximum density is not a compelling requirement, a certain amount of fluxing of the oxide combination is permissible and makes for economy. This fluxing can be carried out by the use of one or more of the silicates taken from the group; calcium silicate, calcium magnesium silicate, potash, feldspar, and nepheline syenite. The amount of flux used should not, however, exceed 25% of the total of the resultant composition.

The composition of this invention has improved hardness qualities over that of my previous disclosure, above referred to, and I have found that those qualities may be controlled by the proportion of titanium oxide employed. In other words, the hardness increases with the increase in titanium oxide contained. The resultant material is nevertheless easy to polish, and, of importance from the point of view of cost of manufacture, my new material is substantially less subject to heat shock. Hence, the number of failures, and consequent waste, among pieces being fired, is materially reduced.

My new material, while improved for use in the ornamental field, also has the advantage of finding many uses in the industrial field, running from bearing parts to abrasives. Suitable and desirable variations in all of its fields can be introduced as desired, through the control made possible by variations in the titanium oxide content.

It is, accordingly, an object of my invention to provide a ceramic composition material capable of use in a variety of fields as a replacement for existing materials.

Another object of my invention is to provide such a material whose characteristics can be readily controlled.

Another object is to improve the hardness and polishing characteristics of such material.

A further object is to reduce the effects of heat shock on ceramic compositions of metallic oxides.

Further and more detailed objects of the invention will in part be obvious and in part be pointed out as the description of the invention proceeds.

The method of preparing the material of the instant invention is generally comparable to that disclosed in my co-pending application Serial No. 594,796, now Patent No. 2,425,954 granted August 18, 1947, above referred to. The oxides in the desired proportionate number of parts, and of carefully selected quality are properly prepared and then fired. The first step in the preparation is a blending of the selected quantities of oxides in a suitable mixing device. On completion of the blending, the mixture is passed through a disintegrating machine to separate the agglomerates. Next, the batch so prepared is calcined at a bright red heat for a sufficient length of time to assure that every portion thereof has been subjected to the full heat for at least an hour. On completion of the calcination, the batch is ground in wet slip form to desired fineness, which may be determined by passing it through a mesh screen, or additionally, through a silk bolting cloth. The resulting product so separated is dried to powder form, disintegrated and is thus ready for mixing with pressing aids to enable it to be properly formed for final firing and finishing.

If it is desired to flux a mixture such as just described, the same is done after the final separation and before the pressing aids are introduced. The fluxing material, also in a finely powdered form, is blended with the powder consisting of the calcined mixture of oxides, and then the pressing aids are added.

The pressing aids employed are any of those such as are usual in the ceramic industry, and serve to maintain the material in pieces of preselected shape. After such pieces are dried, they are fired to a suitable maturation temperature; in this case approximately 2000° Fahrenheit. After firing, and cooling, the blanks can then be given such further treatment as the use to which they are to be put indicates.

As already indicated, an important feature of this invention is the use of the titanium oxide component to effect a control of the characteristics of the material. Thus if characteristics only moderately improved over those of my previous disclosure are desired, the titanium oxide need only be approximately 10% of the oxide mixture. A characteristic formulation at this end of the scale would be 5% copper oxide, approximately 10% titanium oxide and the remainder at least two of the oxides taken from the group; iron oxide, cobalt oxide, nickel oxide and chromium oxide. The latter two or more oxides would, in this instance, form the major part of the composition.

For greatly improved results, however, and a wider field of use, the titanium oxide should be present in much greater quantity. Hence a highly improved product, and one which is preferable, results from the use of from 50% to 65% titanium oxide, while retaining the copper oxide at 5% and making up the difference with at least two of the oxides taken from the group iron oxide, cobalt oxide, nickel oxide, chromium oxide.

When the color of the resultant product is important, it is not desirable to increase the titanium oxide content over 65%, for where titanium oxide is used to the extent of 75%, the color changes from black to a brown.

Any one of the characteristic formulations just mentioned may be fluxed by using at least one of the silicate bearing type of fluxes, such as calcium silicate, calcium magnesium silicate, potash, feldspar, or nepheline syenite above referred to. The use of flux should, however, be limited to 25% of the total mix, for otherwise the fluxing has too much of an effect on the final product.

From the foregoing it will be readily appreciated that I have devised a new composition of matter which is improved over anything heretofore known in its field. Also my new composition may be varied as to characteristics by a simple selection of the quantity of one of the ingredients employed so that desired characteristics may be imparted. Thus the range of use of my composition is expanded beyond anything heretofore appreciated for any such material.

Having described my invention what I claim as new and seek to obtain Letters Patent for is:

1. A composition material consisting of copper oxide, titanium oxide and at least two of the oxides taken from the group; iron oxide, cobalt oxide, nickel oxide and chromium oxide, wherein the copper oxide is present in approximately five percent (5%) of the total and the titanium oxide is in excess of the copper oxide but does not exceed sixty-five percent (65%) of the total.

2. A composition material consisting of five percent (5%) of copper oxide, titanium oxide and the remainder being made up of at least two of the oxides taken from the group; iron oxide, cobalt oxide, nickel oxide and chromium oxide, in which titanium oxide is present in at least twice the amount of the copper oxide.

3. A composition of matter comprising five percent (5%) copper oxide, approximately ten percent (10%) titanium oxide, the remainder comprising two of the oxides of the group; iron oxide, cobalt oxide, nickel oxide and chromium oxide.

4. A composition of matter comprising five percent (5%) copper oxide, from fifty percent (50%) to sixty-five percent (65%) titanium oxide and the remainder comprising two of the oxides from the group; iron oxide, cobalt oxide, nickel oxide and chromium oxide.

5. A ceramic composition comprising approximately five percent (5%) copper oxide, titanium oxide in approximately twice the amount of the copper oxide and a major proportion comprising two oxides of the group; iron oxide, cobalt oxide, nickel oxide and chromium oxide.

DANIEL ROSENTHAL.

REFERENCES CITED

The following references are of record in the file of this patent:

UNITED STATES PATENTS

| Number | Name | Date |
| --- | --- | --- |
| 2,425,954 | Rosenthal | Aug. 19, 1947 |